United States Patent [19]

Berg et al.

[11] Patent Number: 5,186,966
[45] Date of Patent: Feb. 16, 1993

[54] REMOVAL OF FREE WATER FOR PACKAGING COOKED MEAT

[75] Inventors: Svein A. Berg, Angelholm; Jonas P. Halden, Helsingborg, both of Sweden

[73] Assignee: Nestec S.A., Vevey, Switzerland

[21] Appl. No.: 855,123

[22] Filed: Mar. 18, 1992

Related U.S. Application Data

[63] Continuation of Ser. No. 642,413, Jan. 17, 1991, abandoned.

[30] Foreign Application Priority Data

Jan. 24, 1990 [EP] European Pat. Off. ......... 90101389.6

[51] Int. Cl.⁵ .................................................. A23L 1/31
[52] U.S. Cl. ................................... 426/402; 426/410; 426/412; 426/414; 426/415; 426/418
[58] Field of Search ............... 426/107, 113, 124, 129, 426/412, 641, 642, 646, 402, 410, 414, 415, 418

[56] References Cited

U.S. PATENT DOCUMENTS

| | | | |
|---|---|---|---|
| 14,692 | 10/1887 | Metzger | 426/410 |
| 1,408,914 | 3/1922 | Vogt | 426/642 |
| 1,503,864 | 8/1924 | Vogt | 426/641 |
| 1,959,022 | 5/1934 | Donahoe | 426/642 |
| 2,179,676 | 11/1939 | Vogt | 426/124 |
| 2,779,681 | 1/1957 | Sell et al. | 426/642 |
| 2,849,322 | 8/1958 | Brucker | 426/129 |
| 3,415,662 | 12/1968 | Koger et al. | 426/124 |
| 4,081,580 | 3/1978 | Kato | 426/129 |
| 4,237,171 | 12/1980 | Laage et al. | 426/129 |
| 4,321,997 | 3/1982 | Miller | 426/124 |
| 4,857,342 | 8/1989 | Kappes | 426/129 |
| 4,935,276 | 6/1990 | Pawlowski et al. | 426/124 |

OTHER PUBLICATIONS

The Wiley Encyclopedia of Packaging Technology, John Wiley & Sons, 1986, p. 390.

Primary Examiner—Arthur L. Corbin
Attorney, Agent, or Firm—Vogt & O'Donnell

[57] ABSTRACT

Free, unbound water is removed from cooked meat by treating the meat with a water-absorbing material. The treated cooked meat from which water has been removed is then packaged.

9 Claims, No Drawings

REMOVAL OF FREE WATER FOR PACKAGING COOKED MEAT

CROSS REFERENCE TO RELATED APPLICATION

This application is a continuing application of Application Ser. No. 07/642,413, filed Jan. 17, 1991, now abandoned.

BACKGROUND OF THE INVENTION

The present invention relates to a method of removing free, unbound water from cooked meat.

In the manufacture of cooked ham which is sliced and gas packed, one major problem is free water leakage. Meat proteins are denatured during heat treatment and this causes the water-holding capacity of the meat to decrease. Thus, a cooked ham can never bind or immobilise all the water in the product before heating, and if this free water is not allowed to escape before packaging, it appears as visible drip in the packages. When the drip exceeds about 0.3% of the weight of the product (depending on the package size and measuring method), the visual quality of the product is severely reduced.

In spite of attempts to increase the water holding capacity of ham, which include such factors as the use of high quality raw materials (pH 5.7 to 6.1), good salt distribution, efficient tumbling and optimum thermal treatment, the drip problem is not necessarily reduced. It is possible to add polyphosphates, citrate, proteins, or carbohydrates to the injection brine to improve the water holding capacity of the products, but such components are either not permitted by food legislation in many countries or they are not desired in high quality, pure meat products.

SUMMARY OF THE INVENTION

We have devised a method of removing free, unbound water from cooked meat before packaging.

Accordingly, the present invention provides a method of removing free, unbound water from cooked meat characterised in that the meat is treated by contacting it with a water absorbing material after cooking.

DETAILED DESCRIPTION OF THE INVENTION

The present invention is especially advantageous when the cooked meat is a cooked ham or a similar cooked, cured and/or marinated product made from pork, beef, mutton, turkey, etc.

The water-absorbing material should be food-acceptable and may be a tissue, such as paper sheet, or a pad of cellulose fibres such as paper or other natural or synthetic absorbing materials.

Conveniently the meat is wrapped in the water-absorbable material after cooking, and the water removal takes place before chilling, during chilling, during chilled storage, or after slicing. The duration of the treatment for a time period sufficient to remove the water generally lasts for from one to several days, and preferably from 1 to 4 days, conveniently at a storage temperature up to 6° C., preferably 0° C. to 4° C.

During the treatment, the meat is advantageously pressed either in a mould or casing, e.g., the mould or casing used for cooking, or by means of the atmosphere in a vacuum bag.

In a preferred embodiment of the invention, before cooking, the fresh meat is conventionally cut and trimmed, injected with brine and tumbled at a temperature not exceeding 6° C. while allowing at least 24 hours holding (tumbling and resting) between injection and cooking to obtain good salt distribution. The cooking may be carried out in a mould or a casing, after which the meat is wrapped in the water, absorbing material either directly or after chilling. After treatment with the water-absorbing material, the meat may be sliced and gas packed in a modified atmosphere.

EXAMPLES

The following Examples further illustrate the present invention.

Example 1

Fresh hams having pH 5.7 were cut and trimmed. A brine solution having the composition given in Table I was injected with a FOMACO multineedle injector in an amount of 180 g/kg ham.

TABLE I

|  | % |
| --- | --- |
| Water | 83.56 |
| Curing salt | 13.26 |
| Dextrose | 3.0 |
| Ascorbate | 0.17 |
| Garlic extract | 0.01 |

The injected ham was treated under vacuum in DORIT 90 liter tumblers for 15 hours using an interval programme (10 min. on—10 min. off).

The ham was then packed in 12 kg capacity moulds and treated in vacuum for 2 minutes to reduce air pockets before closing the moulds. A total resting time of 15 hours, partly in the moulds, was included to allow for even salt distribution.

The cooking was carried out stepwise as follows:
1. 62° C. chamber temperature to 55° C. internal product temperature
2. 74° C. chamber temperature to 68° C. internal product temperature
3. Holding at 68° C. for 1.5 hours.

The moulds were cooled with a water shower for 10 minutes to ease handling and then opened to drain and weigh the products.

Each ham was wrapped in absorbing paper using 500 g paper/ham, then vacuum packed and chilled at 2° C. After 3 days of storage, the hams were weighed to determine the total yield, then sliced (2 mm thickness) and packed in batches of 4 slices in modified atmosphere packages (2 mm headspace, 20% $CO_2$, 80% $N_2$). The drip was evaluated visually after one week at 8° C. The yield (corrected for an estimated 5% slicing loss) was 92% and the packages were completely free from visible drip.

Comparative Example

Fresh hams were treated in a similar manner to that described in Example 1 except that they were not wrapped in absorbing paper, vacuum packed and chilled. The yield (corrected for an estimated 5% slicing loss) varied between 97.5 and 102% and all the packages had considerable amounts of visible drip.

We claim:

1. A process for preparing a meat product comprising cooking meat and after cooking the meat, contacting the cooked meat with a water-absorbing material for a time period sufficient to remove free, unbound water from the cooked meat, and then packaging a product consisting of the cooked meat from which free, unbound water has been removed.

2. A process according to claim 1 wherein the cooked meat is contacted with the water-absorbing material by wrapping the cooked meat in the water-absorbing material.

3. A process according to claim 1 further comprising chilling the cooked meat and water-absorbing material while contacting the cooked meat with the water-absorbing material.

4. A process according to claim 3 wherein the cooked meat and water-absorbing material are chilled to a temperature up to 6° C.

5. A process according to claim 1 wherein the cooked meat is contacted with the water-absorbing material for a period of from 1 day to 4 days at a temperature of from 0° C. to 4° C.

6. A process according to claim 1 further comprising pressing the cooked meat and water-absorbing material in a mold while contacting the cooked meat with the water-absorbing material.

7. A process according to claim 1 further comprising slicing the cooked meat prior to contacting the cooked meat with the water-absorbing material and then contacting the sliced cooked meat with the water-absorbing material.

8. A process according to claim 1 wherein the water-absorbing material is selected from the group of water-absorbing materials consisting of a paper sheet and a pad of cellulose fibers.

9. A process according to claim 1 wherein the meat is ham.

* * * * *